(12) United States Patent
Liu

(10) Patent No.: US 8,444,173 B1
(45) Date of Patent: May 21, 2013

(54) FOLDABLE FRAME STRUCTURE FOR BABY TRAILER

(76) Inventor: Cheh-Kang Liu, Taipei (TW)

( * ) Notice: Subject to any disclaimer, the term of this patent is extended or adjusted under 35 U.S.C. 154(b) by 51 days.

(21) Appl. No.: 13/331,098

(22) Filed: Dec. 20, 2011

(51) Int. Cl.
*B62B 7/02* (2006.01)

(52) U.S. Cl.
USPC ........................................................ 280/656

(58) Field of Classification Search
USPC ........................................................ 280/656
See application file for complete search history.

(56) References Cited

U.S. PATENT DOCUMENTS

| | | | | |
|---|---|---|---|---|
| 5,020,814 | A * | 6/1991 | George et al. | 280/204 |
| 5,454,577 | A * | 10/1995 | Bell | 280/204 |
| 5,474,316 | A * | 12/1995 | Britton | 280/204 |
| 5,577,746 | A * | 11/1996 | Britton | 280/204 |
| 5,669,618 | A * | 9/1997 | Chiu | 280/204 |
| 5,785,333 | A * | 7/1998 | Hinkston et al. | 280/204 |
| 5,829,770 | A * | 11/1998 | Chiu | 280/204 |
| 5,829,771 | A * | 11/1998 | Hsu | 280/204 |
| 5,947,497 | A * | 9/1999 | Hsu | 280/204 |
| 5,984,332 | A * | 11/1999 | Beaudoin et al. | 280/204 |
| 6,053,518 | A * | 4/2000 | Chiu | 280/204 |
| 6,705,628 | B2 * | 3/2004 | Kahmann | 280/204 |
| 6,896,275 | B1 * | 5/2005 | Liu | 280/204 |
| 6,959,938 | B1 * | 11/2005 | Liu | 280/204 |
| 6,976,697 | B2 * | 12/2005 | Britton et al. | 280/647 |
| 7,052,026 | B2 * | 5/2006 | Sutherland | 280/204 |
| 7,172,206 | B2 * | 2/2007 | Staszak | 280/204 |
| 7,341,265 | B1 * | 3/2008 | Liu | 280/204 |
| 7,354,058 | B2 * | 4/2008 | Chou | 280/651 |
| 7,445,222 | B2 * | 11/2008 | Bell | 280/204 |
| D586,264 | S * | 2/2009 | Liao | D12/101 |
| 8,006,992 | B2 * | 8/2011 | Britton | 280/204 |
| 8,123,241 | B1 * | 2/2012 | Chen | 280/204 |
| 8,226,102 | B2 * | 7/2012 | Liu | 280/204 |
| 8,262,103 | B2 * | 9/2012 | Enserink et al. | 280/31 |
| 2002/0074764 | A1 * | 6/2002 | Allen et al. | 280/204 |
| 2002/0096857 | A1 * | 7/2002 | Valdez et al. | 280/293 |
| 2006/0273555 | A1 * | 12/2006 | Morgan et al. | 280/656 |

* cited by examiner

*Primary Examiner* — Jeffrey J Restifo
(74) *Attorney, Agent, or Firm* — Jackson IPG PLLC

(57) ABSTRACT

A foldable frame structure for baby trailer includes a bottom frame, which includes two side bars and a retractable front bar and a retractable rear bar, two vertical side frames each having two bottom frame bars respectively pivoted to the side bars and an arched top frame bar pivoted to the bottom frame bars, a transverse top bar detachably connected between the arched top frame bars of the two vertical side frames, a trailer bar pivoted to the front side of one side bar of the bottom frame and selectively locked between an extended position and a received position. The retractable rear bar has two angled end pieces respectively affixed to the side bars to reinforce the structural strength of the side bars so that wheels can be directly pivoted to the side bars, saving the cost.

7 Claims, 11 Drawing Sheets

FOLDABLE FRAME STRUCTURE FOR BABY TRAILER

BACKGROUND AND SUMMARY OF THE INVENTION

The present invention relates to a baby trailer and more specifically, to a foldable frame structure for baby trailer, which comprises a bottom frame, a first vertical side frame, a second vertical side frame, and a transverse top bar, wherein the front bar and rear bar of the bottom frame are retractable, facilitating adjustment; the rear bar has the two distal ends thereof respectively terminating in a respective angled end piece and respectively fixedly fastened to the side bars of the bottom frame by fastening members to reinforce the structural strength of the rear ends of the side bars so that wheels can be respectively and directly coupled to the side bars. Thus, the foldable frame structure is inexpensive to manufacture and can be collapsed to reduce the size, facilitating storage, packing or delivery.

U.S. Pat. No. 7,341,265 discloses a frame structure for foldable baby trailer. According to this design, when adjusting the front bar 81 and rear bar 82 of the bottom frame 8, it is necessary to unlock the four locking devices 91;92;93;94. Further, the two distal ends 821 of the rear bar 82 are respectively connected to the respective rear end of the left side bar 83 and the rear end of the right side bar 84. When the frame structure is folded up, the longitudinal distance between the front bar 81 and the rear bar 82 remains unchanged. Further, the wheels 87;88 cannot be directly coupled to the left side bar 83 and the right side bar 84. Affixing the wheel holder frames 85;86 to the left side bar 83 and the right side bar 84 to support the respective wheels 87;88 greatly increases the consumption of material and the manufacturing cost.

The present invention has been accomplished under the circumstances in view.

It is therefore the main object of the present invention to provide a foldable frame structure for baby trailer, which comprises a bottom frame, a first vertical side frame, a second vertical side frame, and a transverse top bar, wherein the front bar and rear bar of the bottom frame are retractable, facilitating adjustment; the first and second vertical side frames are respectively pivoted to the side bars of the bottom frame, each comprised of an arched top frame bar and two bottom frame bars. The arched top frame bar has two distal ends thereof respectively pivotally connected to respective top ends of the bottom frame bars with a respective pivot. Thus, the first and second vertical side frames can be collapsed and closely attached to the bottom frame, and the front bar and rear bar of the bottom frame can be received to shorten the width of the foldable frame structure Further, the rear bar of the bottom frame has the two distal ends thereof respectively terminating in a respective angled end piece and respectively fixedly fastened to the side bars of the bottom frame by fastening members to reinforce the structural strength of the rear ends of the side bars so that wheels can be respectively and directly coupled to the side bars. Thus, the foldable frame structure is inexpensive to manufacture and can be collapsed to reduce the size, facilitating storage, packing or delivery.

Further, the angled end pieces of the inner tube and outer tube of the rear bar are respectively fixedly fastened to a respective rear part of the side bars of the bottom frame at a distance from the respective rear ends of the side bars. As, the rear bar is kept from the rear ends of the side bars at a distance, the size of the collapsed condition of the foldable frame structure can be further minimized, facilitating further storage, packing or delivery.

DETAILED DESCRIPTION OF THE INVENTION

Figure 1:
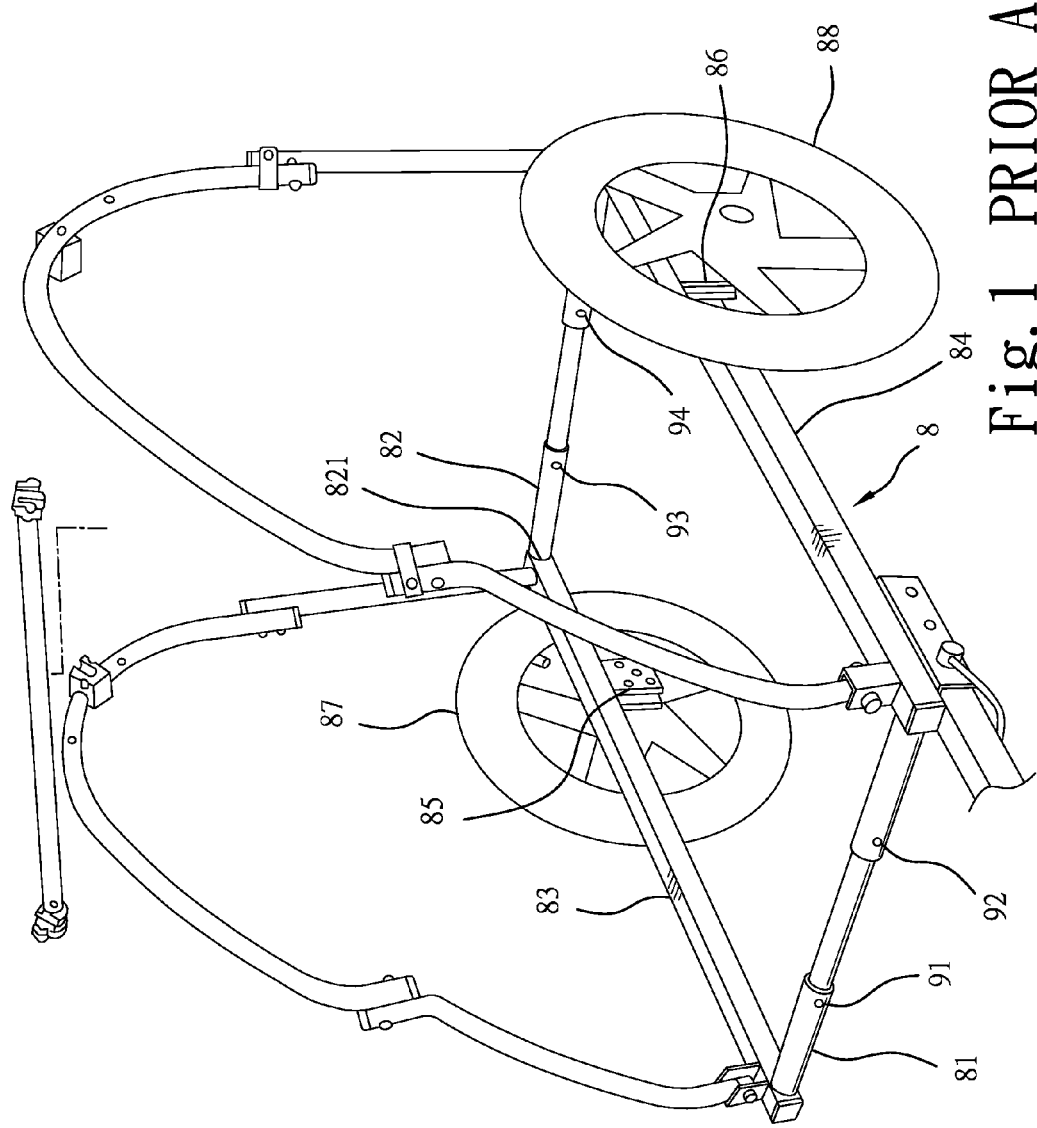
FIG. 1 is an exploded view of a frame structure for foldable baby trailer according to the prior art.
Figure 2:
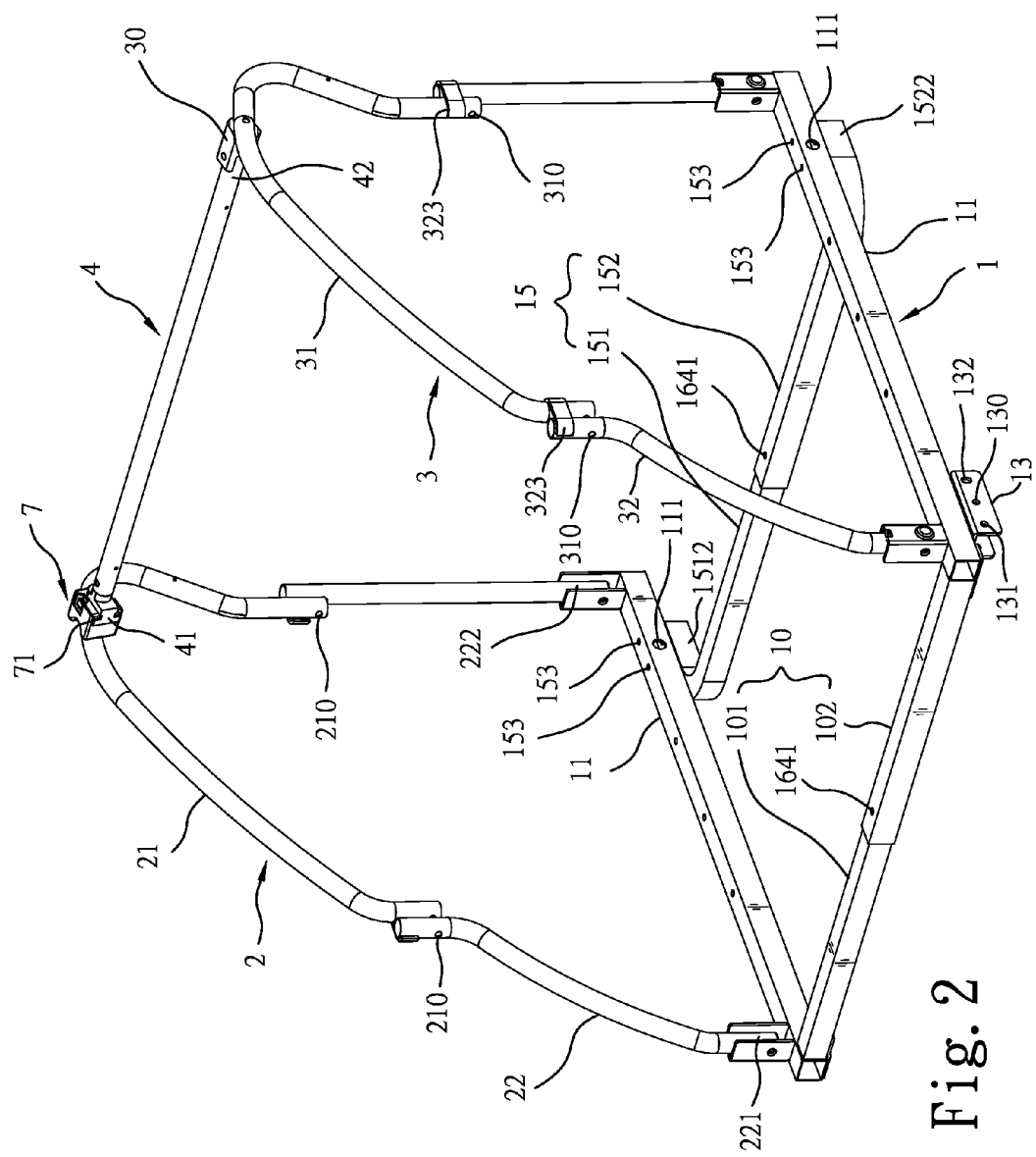
FIG. 2 is an elevational view of a foldable frame structure for baby trailer according to the present invention.
Figure 3:
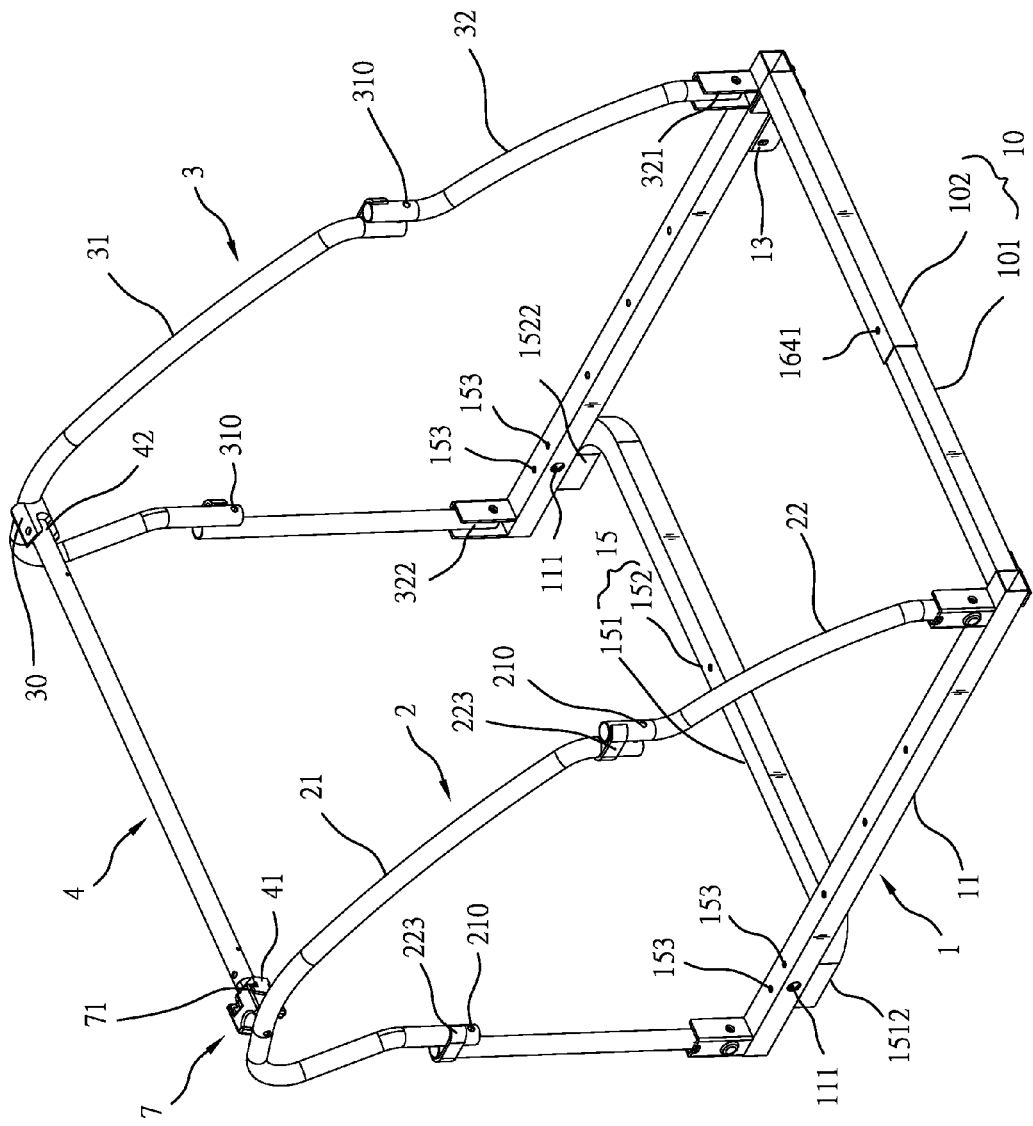
FIG. 3 corresponds to FIG. 2 when viewed from another angle.
Figure 4:
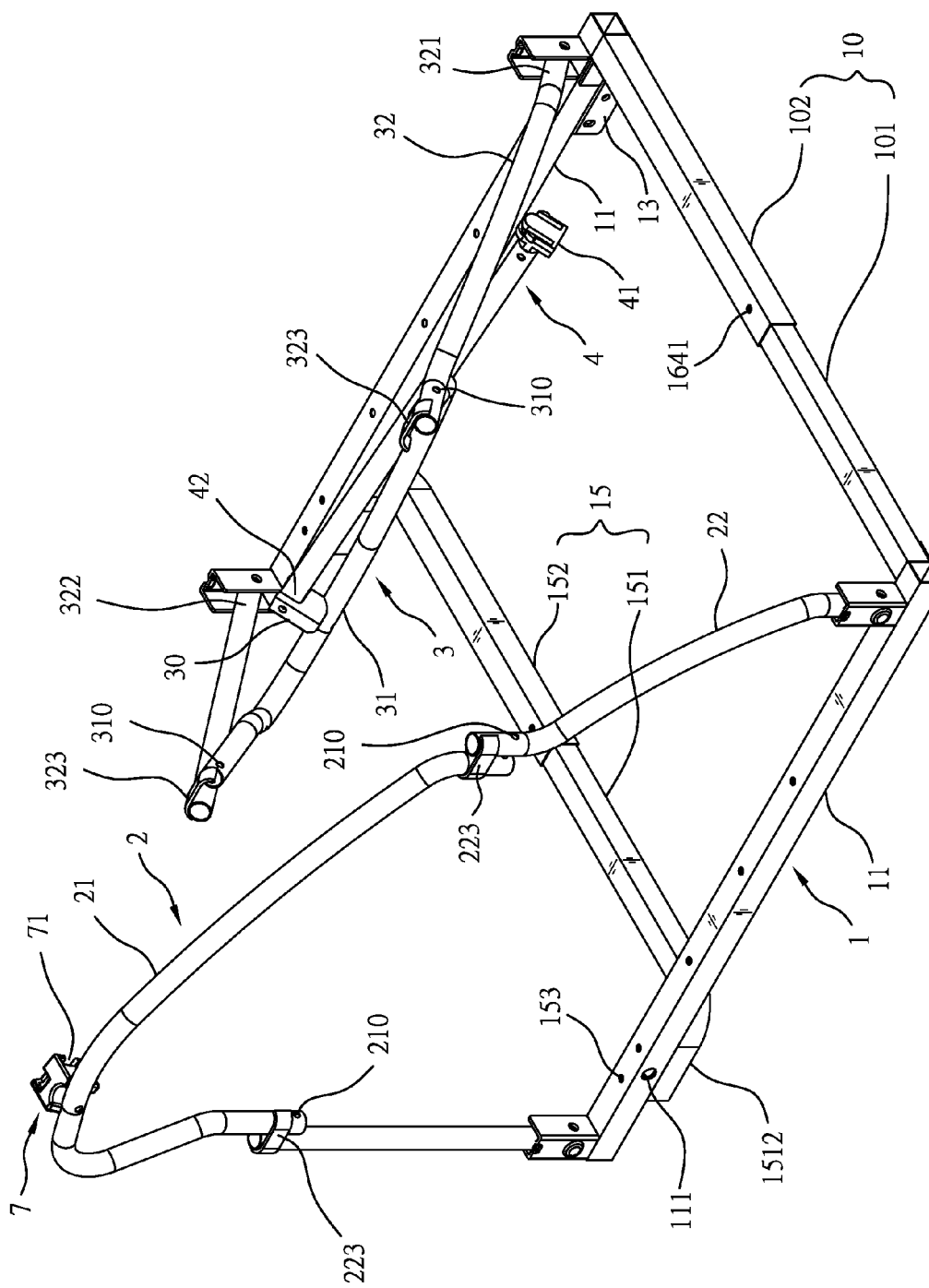
FIG. 4 is a schematic drawing of the present invention, illustrating the transverse top bar disconnected from the first vertical side frame and the second vertical side frame turned downwardly toward the bottom frame.
Figure 5:
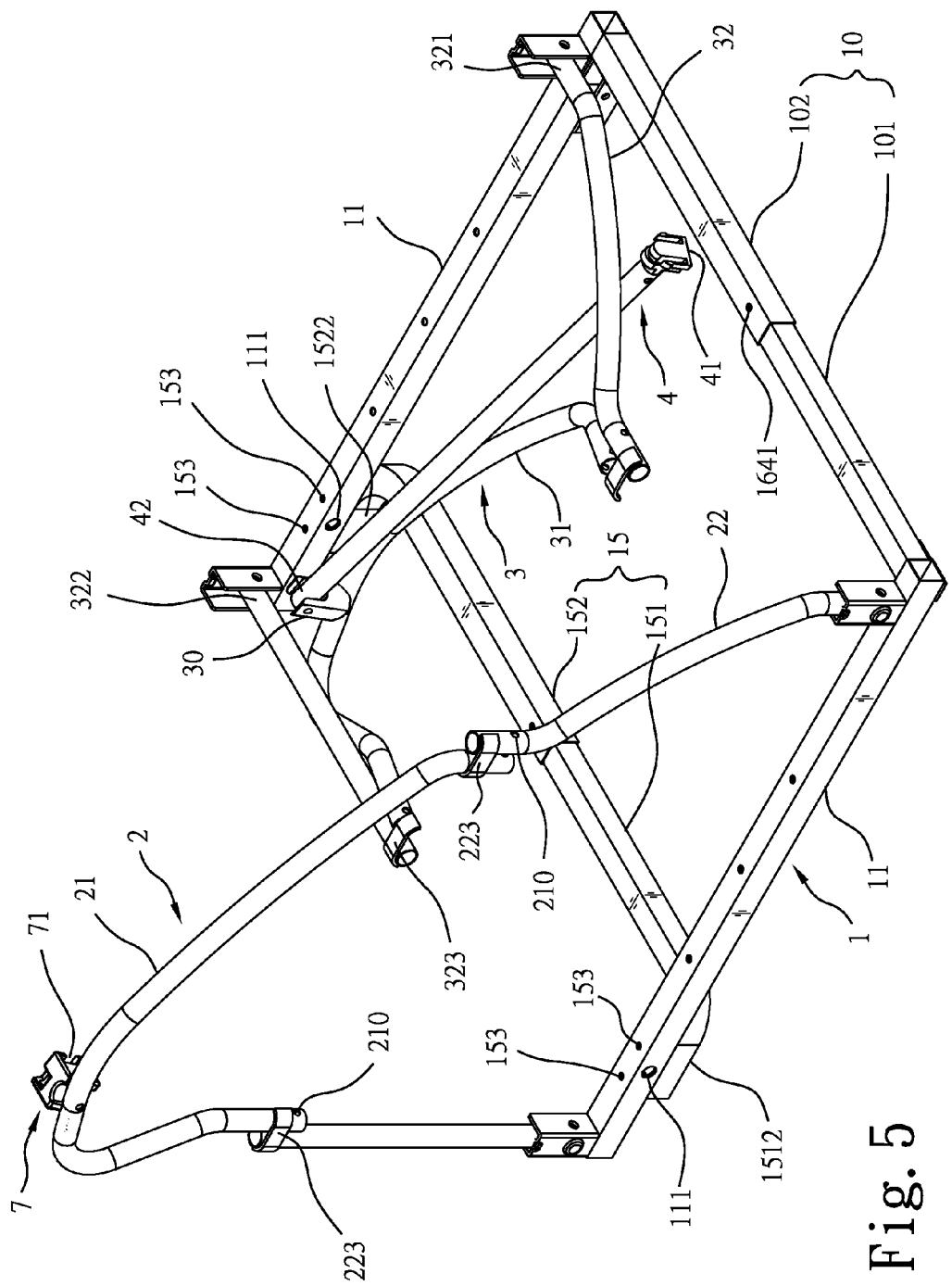
FIG. 5 corresponds to FIG. 4, illustrating the second vertical side frame collapsed and attached to the bottom frame.
Figure 6:
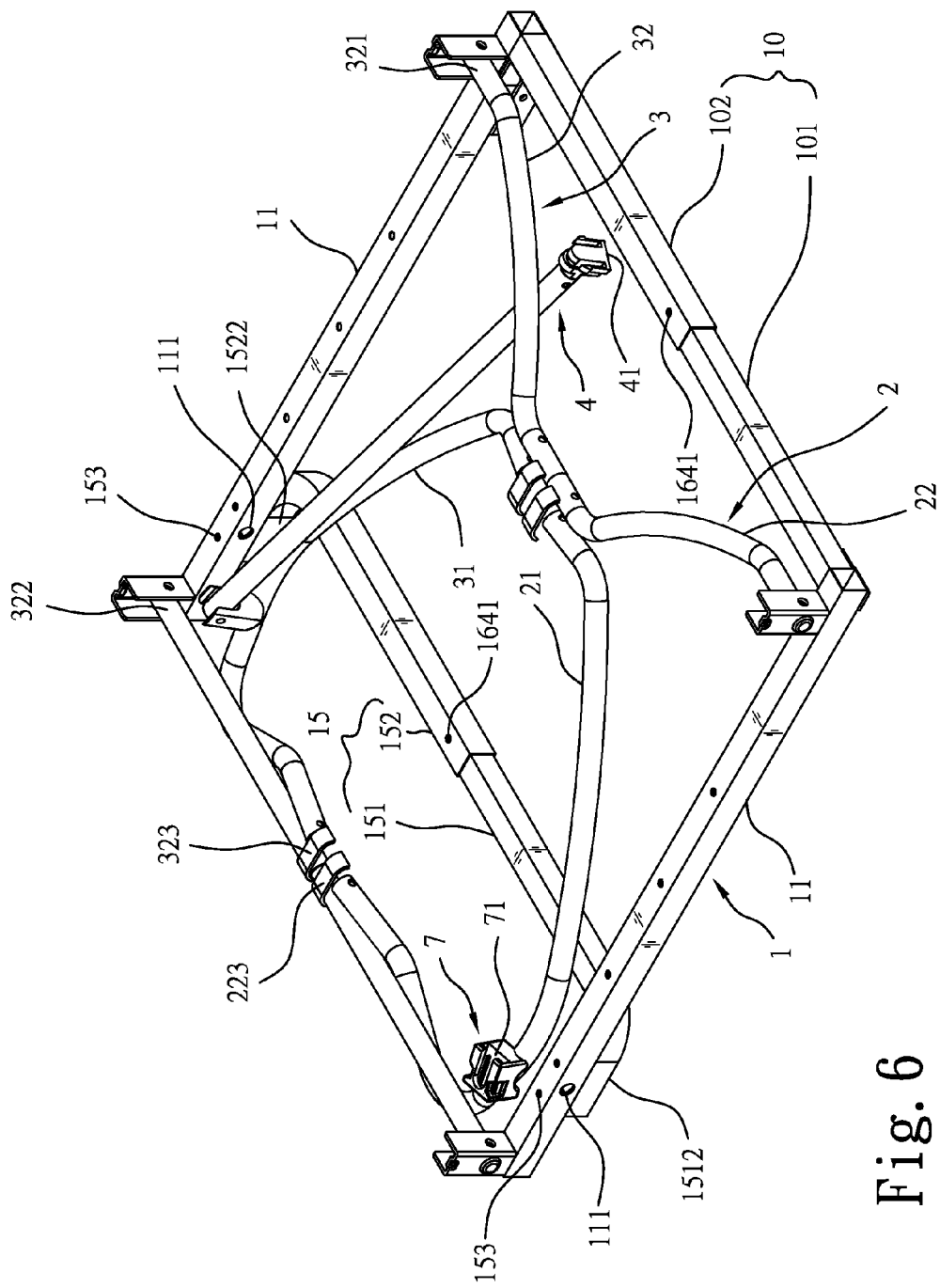
FIG. 6 corresponds to FIG. 5, illustrating the first vertical side frame collapsed and attached to the second vertical side frame above the bottom frame.
Figure 7:
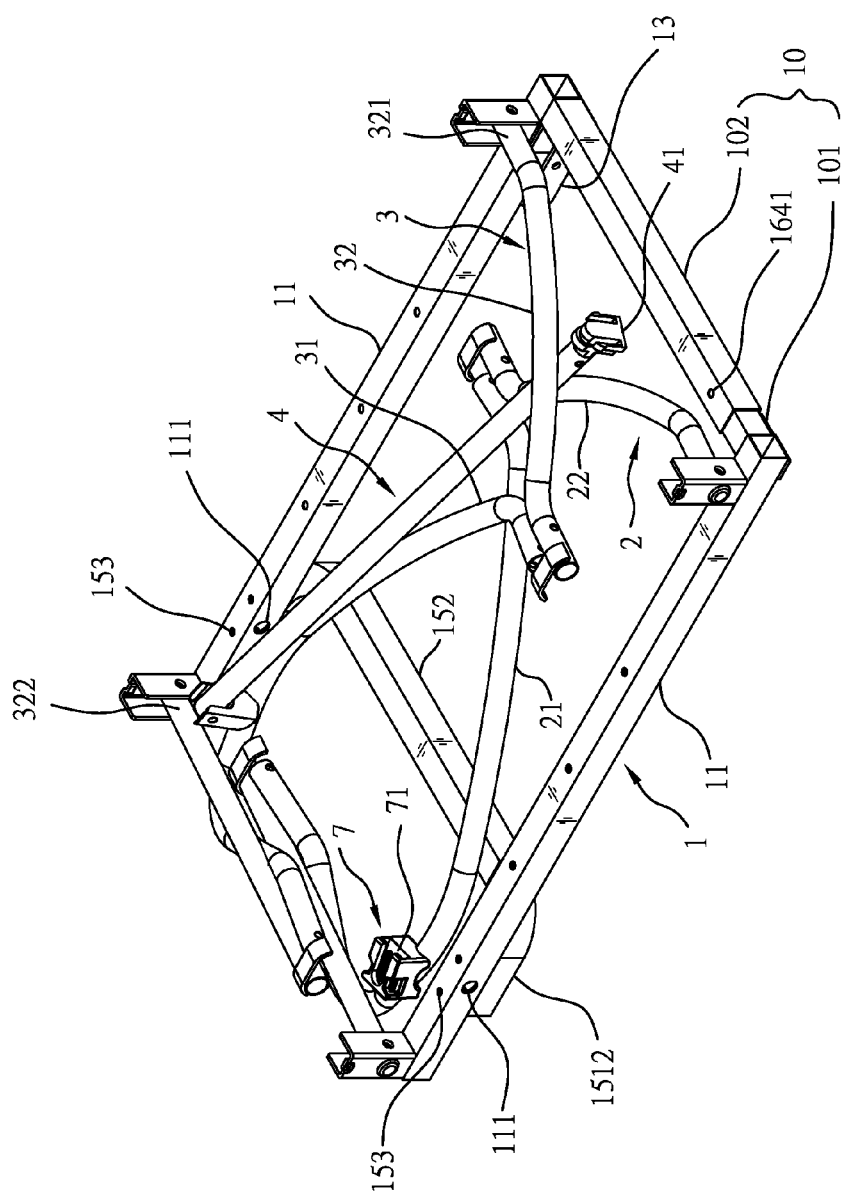
FIG. 7 corresponds to FIG. 6, illustrating the front bar and rear bar of the bottom frame in the received condition.
Figure 8:
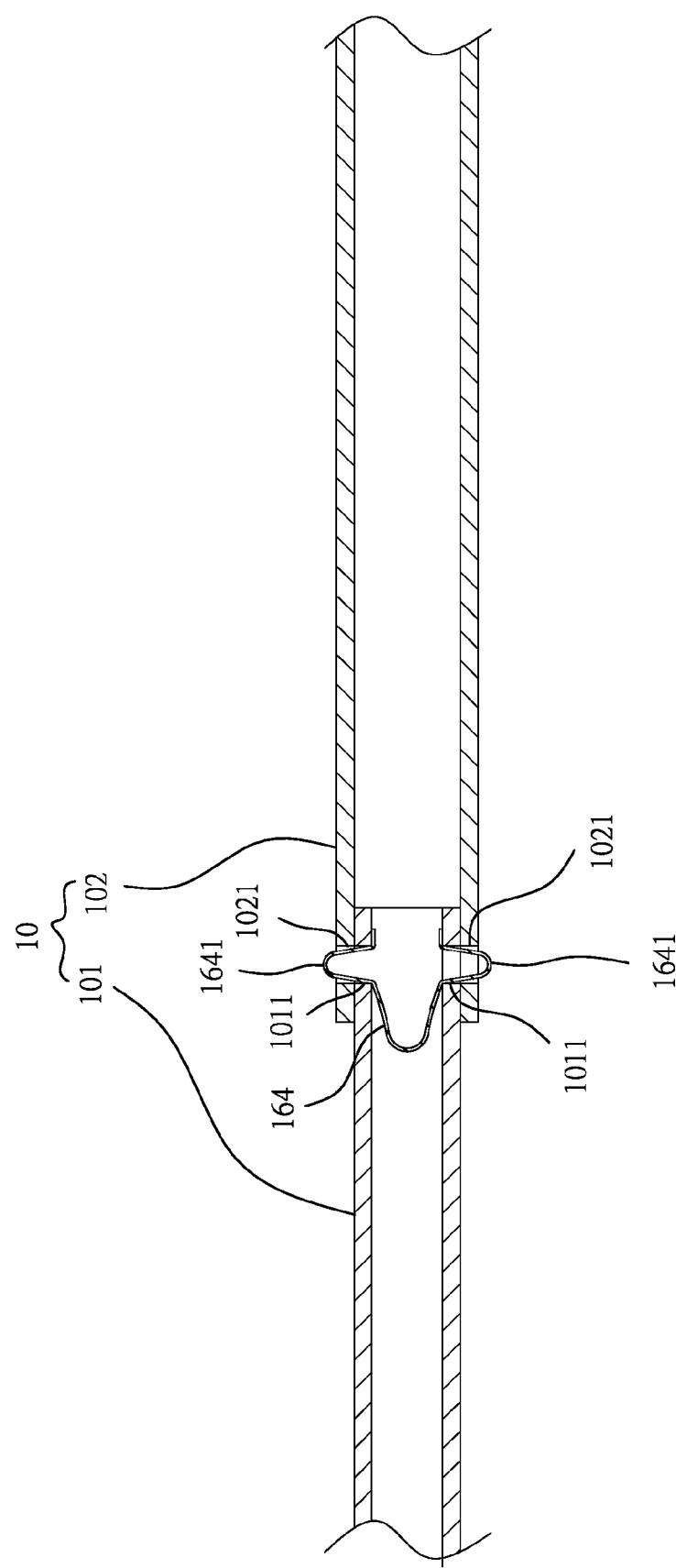
FIG. 8 is a sectional view in an enlarged scale of a part of the present invention, illustrating the retaining spring of the inner tube of the front bar engaged into the locating hole of the outer tube of the front bar.
Figure 9:
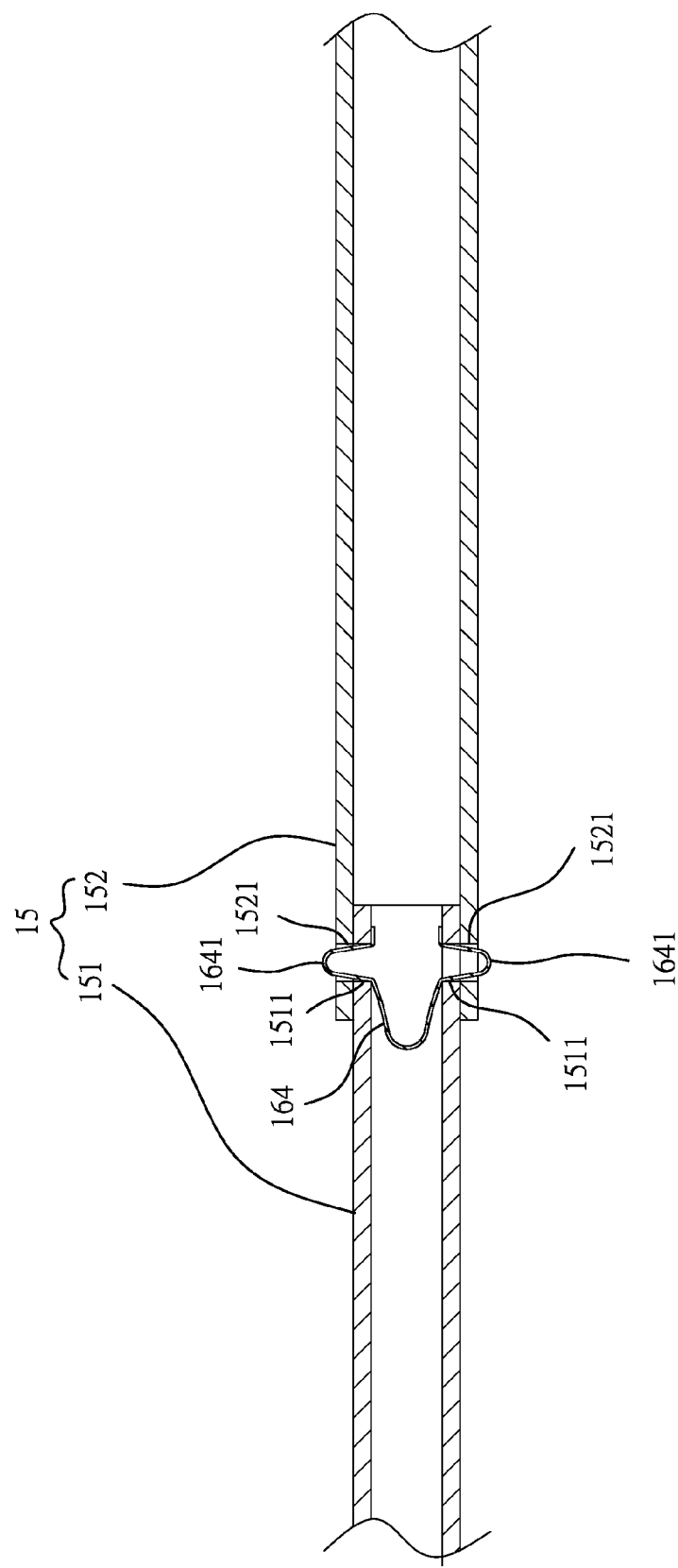
FIG. 9 is a sectional view in an enlarged scale of a part of the present invention, illustrating the retaining spring of the inner tube of the rear bar engaged into the locating hole of the outer tube of the rear bar.

Referring to FIGS. 2-9, a foldable frame structure for baby trailer is shown comprising a bottom frame 1, a first vertical side frame 2, a second vertical side frame 3, and a transverse top bar 4.

The bottom frame 1 comprises two side bars 11 horizontally arranged in parallel at two sides, a front bar 10 and a rear bar 15 connected between the respective front and rear ends of the side bars 11, a channel-like lug 13 affixed to the bottom side of one side bar 11 near its front end and adapted to receive a trailer bar (not shown). The channel-like lug 13 has a pair of pivot holes 130, a pair of front locating holes 131 and a pair of rear locating holes 132. The trailer bar is pivotally coupled to the pivot holes 130, and lockable to the front locating holes 131 or rear locating holes 132 between an extended position and a received position by a lock pin (not shown).

The first and second vertical side frames 2;3 have a substantially U-shaped profile. The two bottom ends 221;222 or 321;322 of the first and second vertical side frames 2;3 are respectively pivoted to the bottom frame 1 (see FIGS. 2 and 3). Further, a lug 7 and a pivot holder 30 are respectively fixedly provided at the first and second vertical side frames 2;3 at the top. The lug 7 has a locating groove 71 for receiving the transverse top bar 4. The first and second vertical side frames 2 and 3 each are comprised of an arched top frame bar 21 or 31, and two bottom frame bars 22 or 32. The arched top frame bar 21 or 31 has the two distal ends respectively pivotally connected to the top ends of the bottom frame bars 22 or 32 with a respective pivot 210 or 310. The bottom frame bars 22 or 32 each have a stop plate 223 or 323 fixedly provided at the respective top end (see FIGS. 2 and 3) for stopping the associating arched top frame bar 21 or 31 to limit the turning angle of the associating arched frame bar 21 or 31 relative to the bottom frame bars 22 or 32, and a bottom end (namely, the aforesaid bottom end 221 or 222, or the bottom 321 or 322) pivoted to the bottom frame 1.

The transverse top bar 4 has a springy hook 41 at one end thereof (see FIGS. 4 through 7) and detachably fastened to the locating groove 71 of the lug 7 at the first vertical side frame 2 (see FIGS. 2, 3, 4 and 5). The other end 42 of the transverse top bar 4 is pivotally connected to the pivot holder 30 at the second vertical side frame 3. Alternatively, two lugs 7 can be respectively fixedly provided at the first and second vertical side frames 2;3 at the top; the transverse top bar 4 can have a springy hook 41 respectively provided at each of the two ends thereof and respectively detachably fastened to the locating grooves 71 of the lugs 7 at the first and second vertical side frames 2 and 3.

The main features of the present invention are outlined hereinafter.

Figure 10:
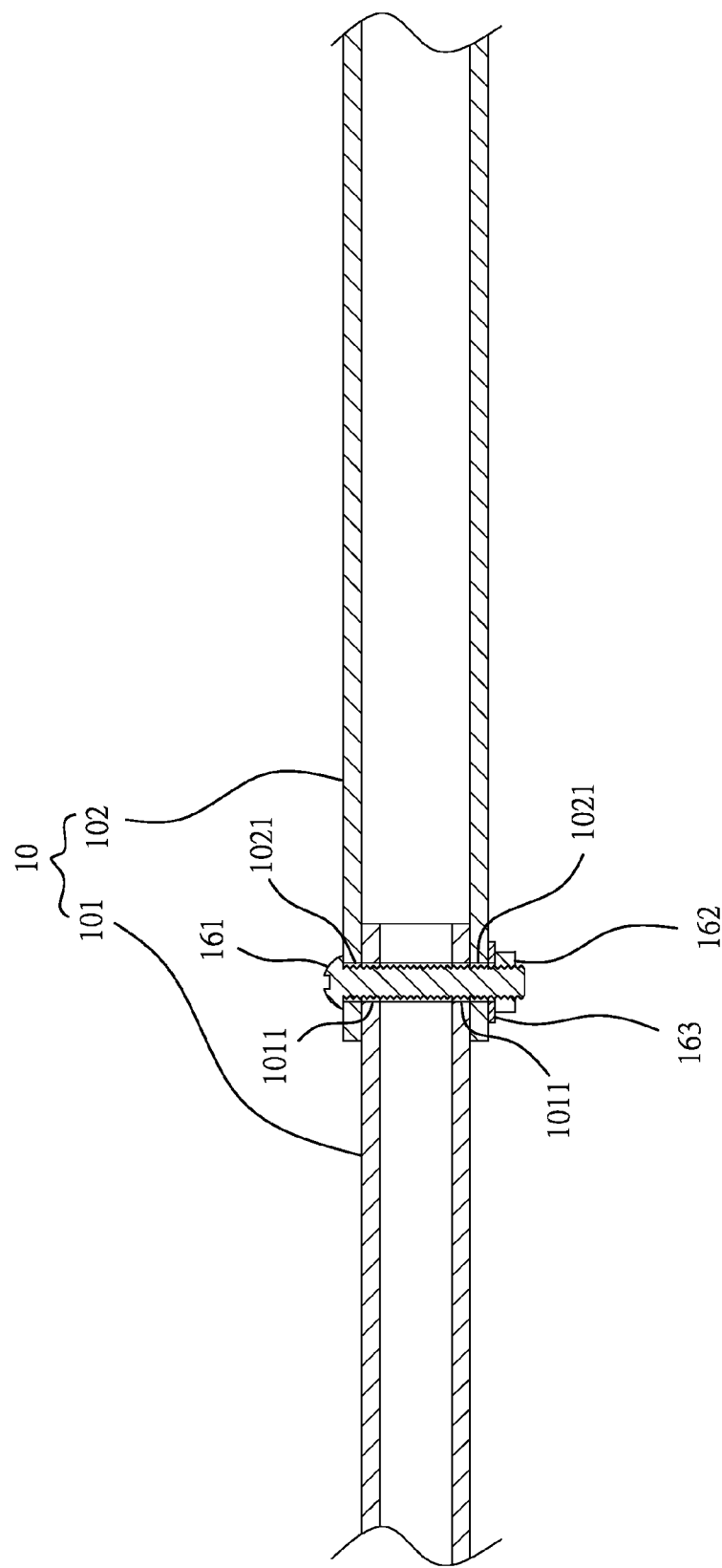
FIG. 10 is a sectional view in an enlarged scale of a part of an alternate form of the present invention, illustrating a screw inserted through the locating hole of the inner tube of the front bar engaged into the locating hole of the outer tube of the front bar and a washer and fastened up with a nut.
Figure 11:
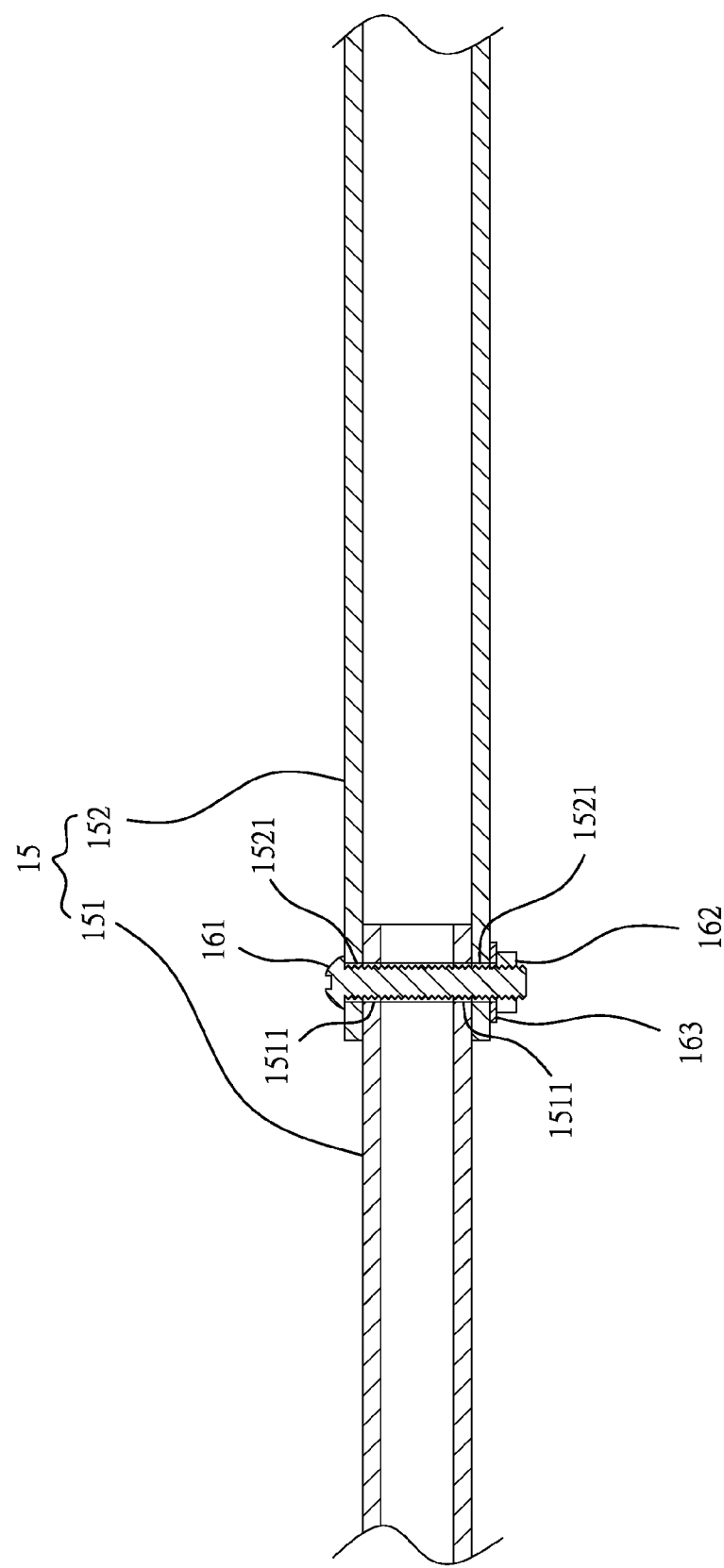
FIG. 11 is a sectional view in an enlarged scale of a part of an alternate form of the present invention, illustrating a screw inserted through the locating hole of the inner tube of the rear bar engaged into the locating hole of the outer tube of the rear bar and a washer and fastened up with a nut.

The front bar 10 and rear bar 15 of the bottom frame 1 are retractable. The front bar 10 comprises an inner tube 101 and an outer tube 102. The inner tube 101 is axially slidably inserted into the outer tube 102, having a locating hole 1011 transversely cut through the periphery near its one end (see FIG. 8). The outer tube 102 has a locating hole 1021 transversely cut through the periphery near its one end. Further, a retaining spring 164 is mounted in the inner tube 101 and inserted through the locating hole 1011 for engaging into the locating hole 1021 of the outer tube 102 to lock the inner tube 101 and the outer tube 102 in the extended position. Alternatively, a screw 161 with a nut 162 and a washer 163 (see FIG. 10) may be used to substitute for the retaining spring 164 for locking inner tube 101 and the outer tube 102 in the extended position, or, a lock pin (not shown) may be used to substitute for the retaining spring 164 for locking the inner tube 101 and outer tube 102 of the front bar 10 in the extended position. The rear bar 15 comprises an inner tube 151 and an outer tube 152. The inner tube 151 is axially slidably inserted into the outer tube 152, having a locating hole 1511 transversely cut through the periphery near its one end (see FIG. 9). The outer tube 152 has a locating hole 1521 transversely cut through the periphery near its one end. Further, a retaining spring 164 is mounted in the inner tube 151, having engagement portions 1641 inserted through the locating hole 1511 for engaging into the locating hole 1521 of the outer tube 152 to lock the inner tube 151 and the outer tube 152 in the extended position. Alternatively, a screw 161 with a nut 162 and a washer 163 (see FIG. 11) may be used to substitute for the retaining spring 164 for locking the inner tube 151 and outer tube 152 of the rear bar 15 in the extended position, or a lock pin (not shown) may be used to substitute for the retaining spring 164 for locking the inner tube 151 and outer tube 152 of the rear bar 15 in the extended position. The inner tube 151 and outer tube 152 of the rear bar 15 have the respective other end terminating in an angled end piece 1512 or 1522 fixedly fastened to the side bars 11 by fastening members 153 or welding, reinforcing the structural strength of the rear ends of the side bars 11. Further, the side bars 11 each have a pivot hole 111 disposed above the angled end pieces 1512;1522 of the rear bar 15 for receiving a respective pivot member to secure one respective wheel (not shown). In other words, the angled end pieces 1512;1522 of the rear bar 15 reinforce the structural strength of the rear ends of the side bars 11, allowing wheels to be directly coupled to the pivot holes 111 of the side bars 11.

When collapsing the foldable frame structure, the user can disengage the springy hook 41 of the transverse top bar 4 from the locating groove 71 of the lug 7 at the first vertical side frame 2, and then turn the transverse top bar 4 toward the arched top frame bar 31 of the second vertical side frame 3, and then turn the arched top frame bar 31 of the second vertical side frame 3 with the transverse top bar 4 toward the bottom frame bars 32 (see FIG. 4), and then turn the transverse top bar 4 and the second vertical side frame 3 downwardly to the base frame 1 (see FIG. 5), and then collapse the first vertical side frame 2 in the same manner (see FIG. 5), and then press the engagement portions 1641 of the respective retaining springs 164 to unlock the respective inner tubes 101;151 from the respective outer tubes 102;152, and then force the respective inner tubes 101;151 into the inside of the respective outer tubes 102;152 (see FIG. 6), thereby shortening the length of the front bar 10 and the length of the rear bar 15. Further, if screws 161 with nuts 162 and washers 163 are used to lock the inner tubes 101;151 and outer tube 102;152 of the front bar 10 and rear bar 15 (see FIGS. 10 and 11), unfasten the respective nuts 162 from the respective screws 161 and then remove the respective screws 161 from the front bar 10 and rear bar 15, allowing the front bar 10 and rear bar 15 to be received in the received condition to shorten the length.

As indicated above, the invention has the following advantages:

1. When collapsing the foldable baby trailer, the arched top frame bars 21 and 31 are turned downwards relative to the associating bottom frame bars 22 and 32, and then the arched top frame bars 21 and 31 are turned downwards with the associating bottom frame bars 22 and 32 and closely attached to the bottom frame 1. Further, by means of pressing the respective retaining springs 164 to unlock the respective inner tubes 101;151 from the respective outer tubes 102;152, the respective inner tubes 101;151 can be received in the respective outer tubes 102;152 to shorten the length of the front bar 10 and the length of the rear bar 15.

2. The angled end pieces 1512;1522 of the inner tube 151 and outer tube 152 of the rear bar 15 are respectively fixedly fastened to the side bars 11 by fastening members 153 or welding to reinforce the structural strength of the rear ends of the side bars 11 so that wheels can be directly pivoted to the side bars 11 without extra wheel holders, saving the cost.

3. The angled end pieces 1512;1522 of the inner tube 151 and outer tube 152 of the rear bar 15 are respectively fixedly fastened to a respective rear part of the side bars 11 at a distance from the respective rear ends of the side bars 11. As, the rear bar 15 is kept from the rear ends of the side bars 11 at a distance, the size of the collapsed condition of the foldable frame structure is minimized, facilitating further storage, packing or delivery.

What is claimed is:

1. A foldable frame structure for baby trailer comprising:
   a bottom frame comprising two side bars horizontally arranged in parallel at two sides, a front bar and a rear bar connected between respective front and rear ends of said side bars, a channel-like lug affixed to a bottom side of one said side bar near a front end thereof and securing a trailer bar, said channel-like lug comprising a pair of pivot holes pivotally coupled to said trailer bar, a pair of front locating holes and a pair of rear locating holes, said trailer bar being pivotally coupled to said pivot holes and selectively lockable to said front locating holes or said rear locating holes between an extended position and a received position by a lock pin;

first and second vertical side frames having a substantially U-shaped profile and two bottom ends respectively pivoted to said side bars of said bottom frame, said first vertical side frame comprising a lug disposed at a top side thereof and defining a locating groove, said second vertical side frame comprising a pivot holder disposed at a top side thereof, said first and second vertical side frames each being comprised of an arched top frame bar and two bottom frame bars, said arched top frame bar having two distal ends thereof respectively pivotally connected to respective top ends of said bottom frame bars with a respective pivot, each said bottom frame bar having a stop plate fixedly provided at the respective a top end thereof for stopping the associating arched top frame bar to limit the turning angle of the associating arched frame bar relative to said bottom frame bars; and a transverse top bar having one end thereof provided with a springy hook detachably fastened to the locating groove of the lug at said first vertical side frame and an opposite end thereof pivotally connected to the pivot holder at said second vertical side frame;

wherein said front bar and said rear bar of said bottom frame are retractable, each comprising an outer tube having a locating hole near one end thereof, an inner tube having a locating hole near one end thereof and being axially slidably inserted into said outer tube, and lock means insertable through the locating hole of said inner tube and the locating hole of said outer tube to lock said inner tube and said outer tube in an extended position; the inner tube and outer tube of said rear bar each have one end thereof respectively axially slidably coupled to each other and an opposite end thereof terminating in a respective angled end piece, the angled end pieces of the inner tube and outer tube of said rear bar being respectively affixed to said side bars of said bottom frame to reinforce the structural strength of said side bars; said side bars of said bottom frame each have a pivot hole disposed above the angled end pieces of said rear bar of said bottom frame for receiving a respective pivot member to secure one respective wheel.

2. The foldable frame structure for baby trailer as claimed in claim 1, wherein the lock means of said front bar of said bottom frame is a retaining spring mounted in the inner tube of said front bar and inserted through the locating hole of the inner tube of said front bar for engaging into the locating hole of the outer tube of said front bar to lock the inner tube and outer tube of said front bar in said extended position.

3. The foldable frame structure for baby trailer as claimed in claim 1, wherein the lock means of said front bar of said bottom frame comprises a screw insertable through the locating hole of the inner tube of said front bar and the locating hole of the outer tube of said front bar, a nut for threading onto said screw to lock said screw to the inner tube and outer tube of said front bar, and a washer mounted on said screw and supported on said nut.

4. The foldable frame structure for baby trailer as claimed in claim 1, wherein the lock means of said front bar is a lock pin insertable through the locating hole of the inner tube of said front bar and the locating hole of the outer tube of said front bar to lock the inner tube and outer tube of said front bar in said extended position.

5. The foldable frame structure for baby trailer as claimed in claim 1, wherein the lock means of said rear bar of said bottom frame is a retaining spring mounted in the inner tube of said rear bar and inserted through the locating hole of the inner tube of said rear bar for engaging into the locating hole of the outer tube of said rear bar to lock the inner tube and outer tube of said rear bar in said extended position.

6. The foldable frame structure for baby trailer as claimed in claim 1, wherein the lock means of said rear bar of said bottom frame comprises a screw insertable through the locating hole of the inner tube of said rear bar and the locating hole of the outer tube of said rear bar, a nut for threading onto said screw to lock said screw to the inner tube and outer tube of said rear bar, and a washer mounted on said screw and supported on said nut.

7. The foldable frame structure for baby trailer as claimed in claim 1, wherein the lock means of said rear bar is a lock pin insertable through the locating hole of the inner tube of said rear bar and the locating hole of the outer tube of said rear bar to lock the inner tube and outer tube of said rear bar in said extended position.

* * * * *